(12) United States Patent
Skupin et al.

(10) Patent No.: US 11,436,270 B2
(45) Date of Patent: Sep. 6, 2022

(54) KNOWLEDGE REFERENCE SYSTEM AND METHOD

(71) Applicants: San Diego State University Research Foundation, San Diego, CA (US); Brigham Young University, Provo, UT (US); Research Foundation of the City University of New York, New York, NY (US)

(72) Inventors: André Skupin, San Diego, CA (US); Brandon S. Plewe, San Diego, CA (US); Sean Ahearn, San Diego, CA (US); Ilknur Icke, Providence, RI (US)

(73) Assignees: San Diego State University Research Foundation, San Diego, CA (US); Brigham Young University, Provo, UT (US); Research Foundation of the City University of New York, New York, NY (US)

( * ) Notice: Subject to any disclaimer, the term of this patent is extended or adjusted under 35 U.S.C. 154(b) by 0 days.

(21) Appl. No.: 14/634,493

(22) Filed: Feb. 27, 2015

(65) Prior Publication Data
US 2015/0248478 A1 Sep. 3, 2015

Related U.S. Application Data

(60) Provisional application No. 61/946,307, filed on Feb. 28, 2014.

(51) Int. Cl.
*G06F 16/36* (2019.01)

(52) U.S. Cl.
CPC .................. *G06F 16/367* (2019.01)

(58) Field of Classification Search
CPC ..................................... G06F 16/367
See application file for complete search history.

(56) References Cited

U.S. PATENT DOCUMENTS

| 7,027,974 | B1 * | 4/2006 | Busch | G06F 17/271 |
| | | | | 704/4 |
| 7,533,124 | B2 * | 5/2009 | Hellman | G06F 16/84 |
| 8,332,345 | B1 * | 12/2012 | Murphy | G06N 5/02 |
| | | | | 706/50 |

(Continued)

*Primary Examiner* — Mark D Featherstone
*Assistant Examiner* — Ranjit P Doraiswamy
(74) *Attorney, Agent, or Firm* — Blank Rome LLP (57) ABSTRACT

A computer system and method for maintaining and using a domain ontology. The computer system includes a triple store comprising a domain ontology, a computer-readable tangible medium comprising software instructions, and a processor configured to access the computer-readable tangible medium to load and execute the software instructions. The software instructions provide a write service configured for receiving a request from a client interface of an authenticated user to edit the domain ontology of the triple store and an interface for updating the domain ontology based on the received request. The method includes steps of providing access to a domain ontology stored on a triple store, receiving a request from a client interface of a first client computer an authenticated user to edit the domain ontology of the triple store, and updating the domain ontology based on the received request by storing updates to the domain ontology in the triple store.

28 Claims, 8 Drawing Sheets

(56) References Cited

U.S. PATENT DOCUMENTS

| | | | | |
|---|---|---|---|---|
| 10,394,829 B2* | 8/2019 | Franceschini | ......... | G06F 16/248 |
| 2006/0075013 A1* | 4/2006 | Hite | ...................... | G06F 16/367 |
| | | | | 709/201 |
| 2010/0169966 A1* | 7/2010 | Yalamanchi | ........ | G06F 21/6245 |
| | | | | 726/21 |
| 2010/0185700 A1* | 7/2010 | Bodain | ............. | G06F 17/30734 |
| | | | | 707/803 |
| 2010/0241644 A1* | 9/2010 | Jackson | ............ | G06F 17/30392 |
| | | | | 707/760 |
| 2014/0207712 A1* | 7/2014 | Gonzalez Diaz | ...... | G06N 5/025 |
| | | | | 706/12 |
| 2016/0034538 A1* | 2/2016 | Oberle | .................... | H04L 67/02 |
| | | | | 707/722 |

\* cited by examiner

KNOWLEDGE REFERENCE SYSTEM AND METHOD

CROSS REFERENCE TO RELATED APPLICATIONS

This application claims the benefit of U.S. Provisional Application No. 61/946,307, entitled "Knowledge Reference System" and filed Feb. 28, 2014, the contents of which application are incorporated herein by reference.

STATEMENT REGARDING FEDERALLY SPONSORED RESEARCH OR DEVELOPMENT

This invention was made with government support under Award Number 0964563 by the National Science Foundation Division of Geography and Spatial Sciences. The government has certain rights in the invention.

FIELD OF THE INVENTION

The present invention relates to a knowledge reference system and, more specifically, to a system and method for creating, editing, and utilizing a body of knowledge maintained in a computer system.

BACKGROUND OF THE INVENTION

Cyberinfrastructure (CI) is transforming what scientists can do by changing how they can do it. There is a major paradigm shift underway in how computational problems are thought about and how individuals and groups collaborate. The Internet has enabled distributed collaboration on an unprecedented scale and fundamentally changed collaboration. Important components that act as enablers of this web-based change are high performance computing, distributed data and services, distributed collaboration, and the semantic web.

Another other major shift in CI concerns thinking about and interaction with knowledge. The semantic web has enabled the creation of linkages between different domains in ways that were previously impossible, and proposals have been made for ontologies specific to domains of interest. Underlying this change is the dynamic nature of the knowledge base on which CI is founded and how it interacts with the domains of interest.

The Model Curricula project was initiated by the University Consortium for Geographic Information Science (UCGIS) Model Curricula Task Force in the late 1990s as an effort to address educational challenges in the field. The report produced by the task force called for the development of a "Body of Knowledge" (BoK), envisioned as a comprehensive inventory of the Geographic Information Systems & Technology (GIS&T) knowledge domain.

The first version of the GIS&T BoK was the result of a collaborative effort and included more than 350 topics organized in 79 units and ten knowledge areas. Each topic was accompanied by terms of one or more educational objectives.

Although a number of papers discussed the importance of using BoK in educational settings, frameworks for actual implementation have been limited.

SUMMARY OF THE INVENTION

In accordance with an aspect of the present invention, there is provided a computer system for maintaining a domain ontology. The computer system comprises a triple store comprising a domain ontology, a computer-readable tangible medium comprising software instructions, and a processor configured to access the computer-readable tangible medium to load and execute the software instructions. The software instructions provide a write service configured for receiving a request from a client interface of an authenticated user to edit the domain ontology of the triple store and an interface for updating the domain ontology based on the received request.

In accordance with another aspect of the present invention, there is provided a networked computer system for maintaining a domain ontology. The networked computer system comprises a first client computer system comprising an interface, the first client computer system for being operated by an authenticated user and a server. The server comprises a triple store comprising a domain ontology, a computer-readable tangible medium comprising software instructions, and a processor configured to access the computer-readable tangible medium to load and execute the software instructions. The software instructions provide a write service configured for receiving a request from the client interface of the client computer system to edit the domain ontology of the triple store and an interface for updating the domain ontology based on the received request.

In accordance with another aspect of the present invention, there is provided a method for maintaining a domain ontology. The method comprises steps of providing access to a domain ontology stored on a triple store, receiving a request from a client interface of a first client computer an authenticated user to edit the domain ontology of the triple store, and updating the domain ontology based on the received request by storing updates to the domain ontology in the triple store.

BRIEF DESCRIPTION OF THE DRAWINGS

For the purpose of illustration, there are shown in the drawings certain embodiments of the present invention. In the drawings, like numerals indicate like elements throughout. It should be understood that the invention is not limited to the precise arrangements, dimensions, and instruments shown. In the drawings.

DETAILED DESCRIPTION OF THE INVENTION

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

In many disciplines, bodies of knowledge and domain ontologies are frequently created by domain experts in a top-down manner. It would be desirable for a Body of Knowledge (BoK) to be developed using bottom-up strategies by applying computational and visual analysis to the artifacts and activities of the knowledge domain. Such evaluation and restructuring of the BoK may desirably be supported by a variety of data mining and spatialization techniques, including natural language processing, graph layout and self-organizing maps. Another bottom-up strategy would desirably aim to actively leverage the collective knowledge and insight of domain actors (i.e., members of the domain or disciplinary community) in a participatory, collaborative setting where concept development, editing, and validation are supported by a visual wiki environment.

A knowledge domain refers to the aggregate of all the actors, activities, and artifacts that are bound by certain recognizable social constructs, including exhibiting significant thematic and epistemic coherence. It encompasses the notion of disciplines, but recognizes the existence of persistent structures of knowledge construction and consumption beyond disciplinary boundaries.

A domain actor is an entity (e.g., person, organization, and institution) actively engaged in producing and consuming knowledge artifacts. The participatory mode of bottom-up BoK creation depends on actors bringing their experiences, abilities, and perspectives—their internal knowledge—to bear. Domain actors are among the intended users of a formalized BoK, but can also become objects of analysis, such as when a person's capabilities are being scored with respect to BoK concepts.

Actors within a domain are engaged in various activities (domain activities) that produce and/or consume knowledge artifacts, within the broad categories of research, education, and professional practice. Examples might include a research project, a university course, an analysis task, or a job. Depending on an actor's role within the domain, there may be significant variety in the types of activities as well as in the types of artifacts entailed and in the productive/consumptive relationship between actors and artifacts.

Processes of knowledge production and consumption involve physical artifacts (i.e., externalized as compared to internal, cognitive artifacts, which most commonly are just referred to as "knowledge"), such as research articles, grant proposals, course syllabi, websites, textbooks, and software code. Such artifacts are sometimes referred to as "knowledge artifacts."

The aggregate of all internal knowledge (e.g. actors' relevant skills) and external artifacts contained in a domain is a knowledge corpus. The task of constructing a BoK may include conceptualizing, capturing, and transforming that corpus. The framework and key parameters for accomplishing this is described herein.

Figure 1:
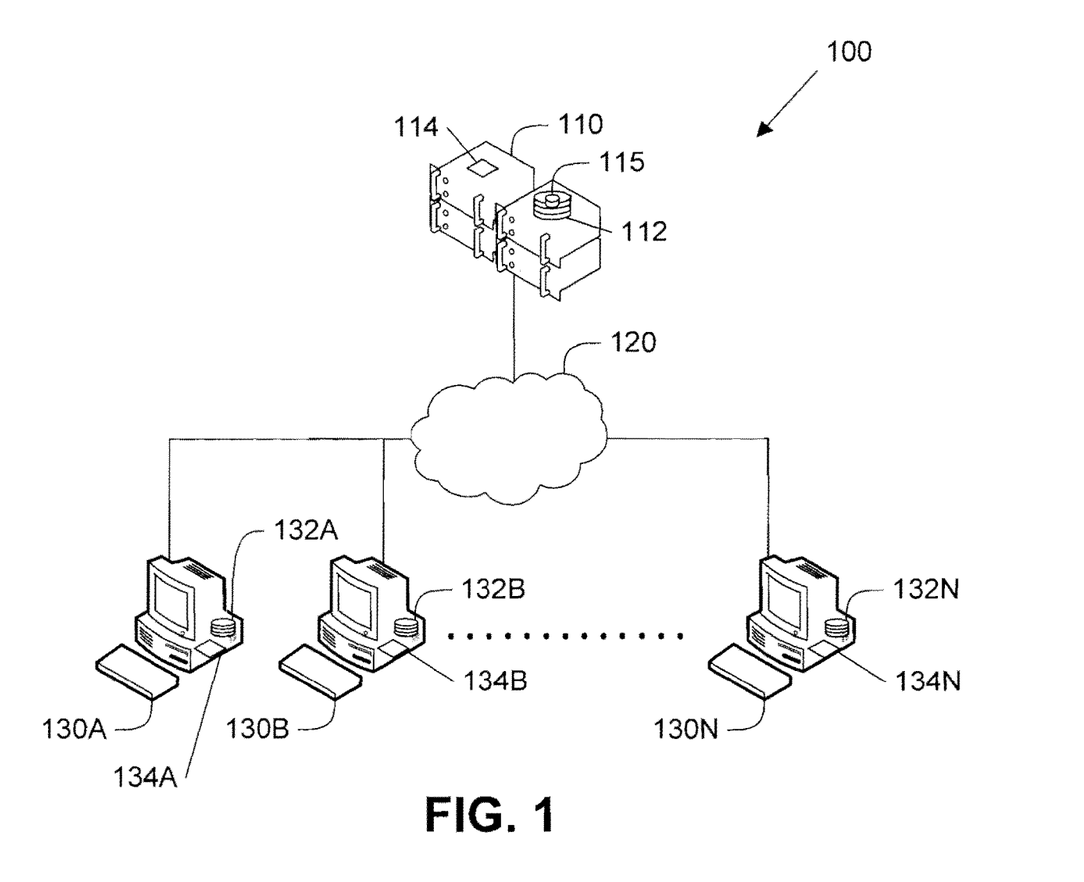
FIG. 1 illustrates a networked computer system for maintaining a domain ontology, in accordance with an exemplary embodiment of the present invention.

Referring now to FIG. 1, there is illustrated a networked computer system, generally designated as 100, for maintaining a domain ontology, in accordance with an exemplary embodiment of the present invention. The computer system 100 comprises a server 110 connected to a plurality of client computer systems 130A, 130B, . . . , 130N (referred to herein either individually herein as "client computer system 130" or collectively as "client computer systems 130," as context dictates) connected to the server 110 via a network 120. The server 110 comprises a computer-readable medium 112 and a processor 114. The client computer system 130A comprises a computer-readable medium 132A and a processor 134A. The client computer system 130B comprises a computer-readable medium 132B and a processor 134B. The client computer system 130N comprises a computer-readable medium 132N and a processor 134N.

The system 100 further comprises a triple store 115. The triple store 115 stores data as triples, each triple comprising a subject, an object, and a predicate specifying a relationship between the subject and object. The triple store 115 stores a plurality of triples. It is contemplated that the triple store 115 will store dozen, hundreds, thousands, or even millions of triples. There is no theoretical limit to the number of triples stored in the triple store 115. The collection of all of the data in the triple store 115 and their logical relationships forms an embodiment of an ontology. The network 120 may be the Internet, a local-area network, a wide-area network, or any kind of computer network.

In one exemplary embodiment, the triple store 115 is internal to the server 110. In such embodiment, the triple store 115 is stored on the computer-readable medium 112 disposed within the server 110. In another exemplary embodiment, the triple store 115 is external to the server 110. In such embodiment, the triple store 115 is stored on an external computer readable medium. It is to be understood that the computer-readable medium 112 and the external computer-readable medium may be any tangible computer readable medium on which data may be stored, such as a computer hard drive, an optical medium (e.g., an optical disc), a solid-state memory (e.g., flash memory), and other storage media known in the art.

The client computer systems 130 may be any kind of computing device, such as a personal computer, a laptop computer, a tablet computer, a smart phone, etc. It is to be understood that the client computer system 130 need not be the same kind of computing device. The client computer system 130A may be a personal computer, the client computer system 130B may be a tablet computer, and the client computer system 130C may be a smart phone.

The server 110 may be a web server that hosts a plurality of web applications. Each web application is accessible by a respective one of the client computer system 130 over the Internet 120. Each of the client computer systems 130 may execute a client application that interacts with the web application hosted by the server 110. In an exemplary embodiment, the client application may be a web browser that provides a client-side interface to any of the web applications hosted by the server 110. Access to one of the plurality of web applications is determined by super user of the system 100.

Figure 2:
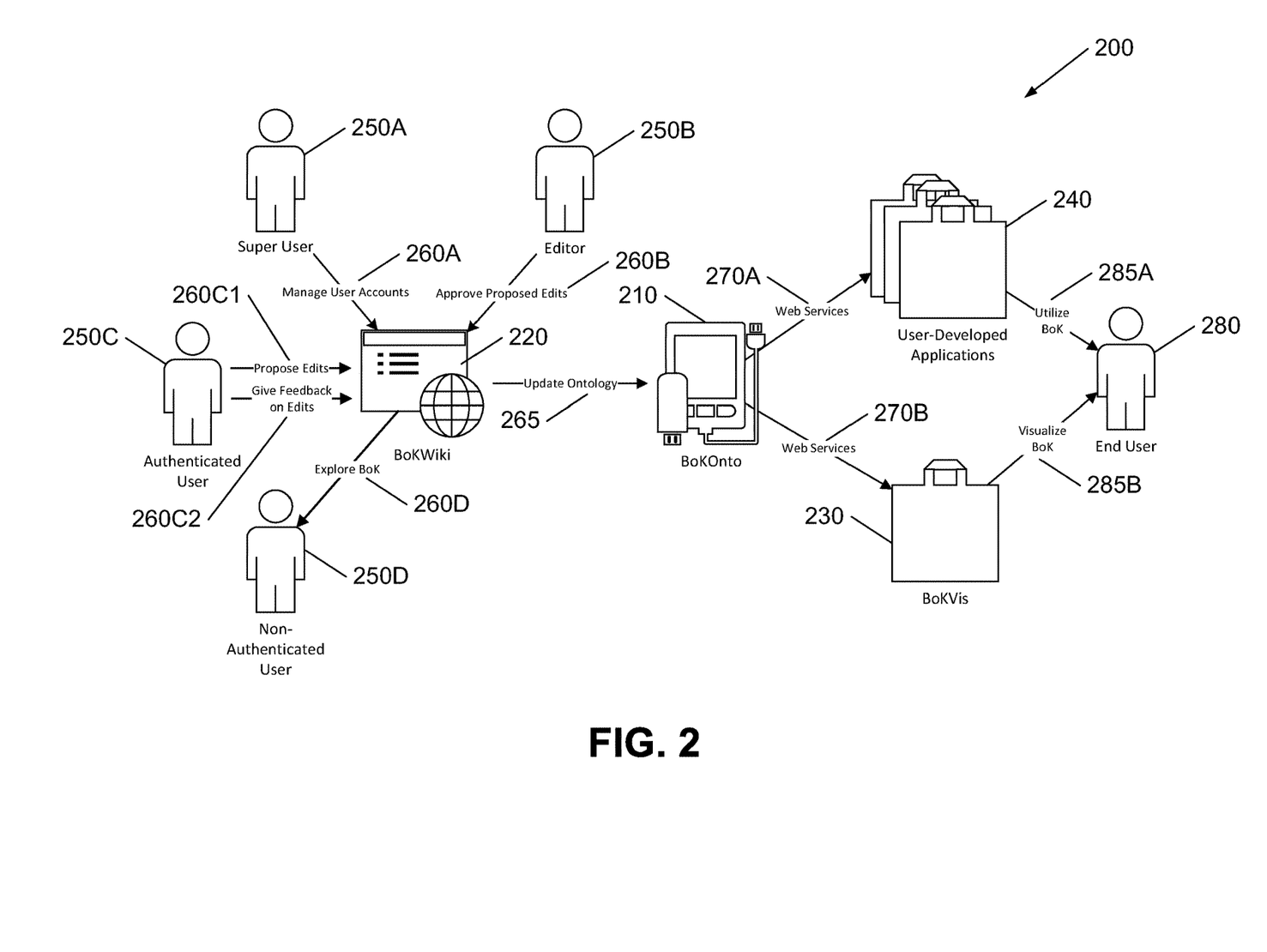
FIG. 2 illustrates a representation of dataflow and software components, applications, and concepts of the system of FIG. 2, in accordance with an exemplary embodiment of the present invention.

Illustrated in FIG. 2 is a representation, generally designated as 200, of dataflow and software components, applications, and concepts of the system 100, in accordance with an exemplary embodiment of the present invention. The software concepts comprise a body of knowledge ontology ("BoKOnto") component 210, a client interface component 220, a visualization component 230, and one or more user-developed applications 240. The BoKOnto component 210 maintains the BoKOnto (not illustrated in FIG. 2) and its BoK (not illustrated in FIG. 2). The BoKOnto component 210 is maintained by the server 110.

With reference to FIGS. 1 and 2, the system 100 provides for user accounts having various levels of access to the server application 210. FIG. 2 indicates four types of user accounts: super user 250A, editor 250B, authenticated user 250C, and non-authenticated user 250D. (For purposes of discussion herein, reference numbers 250A, 250B, 250C, and 250D may refer to either a user or his user account.) Each of such users may use the client interface component 220 to access the BoKOnto component 210. The user account of a user specifies the level of access of the BoKOnto component 210 that the user may access via the client interface component 220. The client interface component 220 may reside on any of the client computer systems 130. The one or more user-developed applications 240 may also reside on any of the client computer systems 130.

A non-authenticated user 250D may access the BoKOnto component 210 hosted by the server computer 110 to explore the BoKOnto and BoK of the BoKOnto component 210. The data of the BoKOnto and BoK provided to the non-authenticated user 250D is designated as 260D in FIG. 2.

An authenticated user 250C has access to more features of the BoKOnto over that of a non-authenticated user 250D. An authenticated user 250C has the ability to propose edits 260C1 to the BoKOnto and to give feedback on edits 260C2 proposed by other authenticated users. A non-authenticated user 250D may not propose edits to the BoKOnto and many not give feedback on edits proposed by other authenticated users.

An editor 250B has access to more features of the BoKOnto over that of an authenticated user 250C. An editor 250B has the power to approve edits 260B to the data of the BoKOnto proposed by authenticated users to update the BoKOnto, which update is generally designated as 265 in FIG. 2. A super user 250A manages user accounts 260A. A super user 250A may accept an application of a user to become a non-authenticated user 250D. The super user 250A may also create a non-authenticated user account, an authenticated user account, an editor account, and another super user account for any user. The super user 250A may upgrade a user account to another user account having more powers or may downgrade a user account to another user account having fewer powers. The super user 250A may also terminate any user account.

The BoKOnto describes the relationships between and among data in a BoK. The BoK data and data describing the relationships between and among the data in the BoK are stored in the triple store 115. The server computer 110 maintains the BoKOnto and specifically the BoK data and the data describing the relationships between and among the data in the BoK.

The BoKOnto component 210 provides web services 270A to the user-developed applications 240 and web services 270B to the BoKVis 230. An end user 280 utilizes the BoKOnto via the one or more user-developed applications 240 and visualizes the BoKOnto via the visualization component (BoKVis) 230. Utilization of the BoKOnto by the end user 280 is generally designated in FIG. 2 as 285A, and visualization of the BoKOnto by the end user 280 is generally designated in FIG. 2 as 285B.

Figure 3:
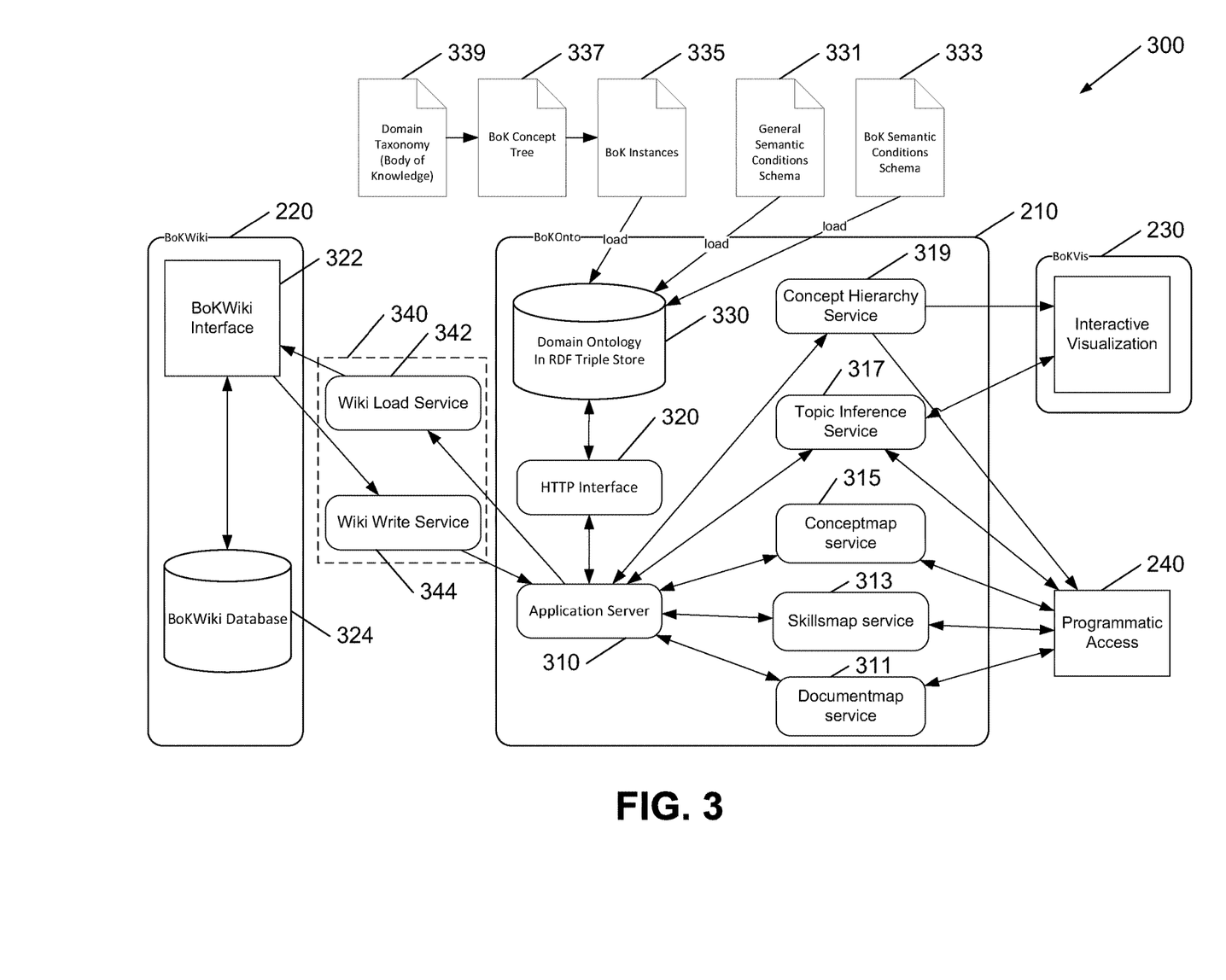
FIG. 3 illustrates a software framework of the representation of FIG. 2, in accordance with an exemplary embodiment of the present invention.

Referring now to FIG. 3, there is illustrated a software framework, generally designated as 300, of the representation 200 of dataflow and software components, applications, and concepts implemented by the system 100, in accordance with an exemplary embodiment of the present invention. With reference to FIGS. 1-3, the software framework 300 comprises the BoKOnto component 210, which itself comprises an application server 310, an HTTP interface 320, and the BoKOnto, generally designated as 330. The BoKOnto 330 is stored on the triple store 115. The BoKOnto 330 is formed by loading a general semantic conditions schema 331, a BoK semantic conditions schema 333, and, optionally, BoK instances 335. The BoK instances 335 are formed from a BoK concept tree 337 and follow a domain taxonomy 339.

The application server 310 comprises a plurality of services, including a client interface component interface service 340, which comprises a load service 342 and a write service 344. The application server 310 further comprises a Documentmap service 311, a Skillsmap service 313, a Conceptmap service 315, a Topic Inference service 317, and a Concept Hierarchy service 319. The one or more user-developed applications 240 access the services 311, 313, 315, 317, and 319. The visualization component 230 accesses the service 319.

The client interface component 220 comprises an interface 322 and a database 324. In an exemplary embodiment, the client interface component 220 is a BoKWiki; the client interface component interface service 340 is an interface between the BoKOnto component 210 and the BoKWiki 220; the load service 342 is a Wiki Load Service; the write service 344 is a Wiki Write Service; the interface 322 is a BoKWiki interface; and the database 324 is a BoKWiki database 324. The BoKWiki 220 interfaces with the BoKWiki service 340 via the BoKWiki interface 322 to load data from the BoKOnto 330 via the Wiki load service 342 and to write data to the BoKOnto 330 via the Wiki write service 344.

In an exemplary embodiment, the triple store 115 is interfaced with a SPARQL endpoint, which allows the BoKOnto 330 to be queried using the SPARQL query language. The SPARQL endpoint is not directly open to the public, since it would require users to learn the SPARQL query language and issue queries directly. Instead, the services 311 through 319, 342, and 344 run queries internally and return data. In an exemplary embodiment, the services 311 through 319, 342, and 344 return data in an XML format. In another exemplary embodiment, the services 311 through 319, 342, and 344 are web services that can be accessed by users via web interface. It is contemplated that the services 311 through 319, 342, and 344 may be accessed programmatically.

The system 300 comprises three layers: (1) the BoKOnto 330, which comprises data specifying taxonomy, instances, inferences, and mappings; (2) a server layer for administration and management of the BoKOnto 210; and (3) a service application/interface layer by which users access, view, and modify the BoKOnto 210. In an exemplary aspect of such embodiment, the BoKOnto 330 follows Resource Description Framework (RDF) and Web Ontology Language (OWL) standards. Thus, in such embodiment, the triple store 115 is an RDF triple store. The BoKOnto 210 describes a flexible, but standardized set of concepts, allowing for multiple situated views of the knowledge corpus by users, e.g., researchers, educators, professionals, novices or experts.

The server layer is administered by the application server 210 and handles all administration and management of the BoKOnto 210. In an exemplary embodiment, the application server 210 is implemented as a semantic web application, which includes an approval process for populating the ontology 210, customized analysis, database versioning, and general database management tasks. A summary of the approval process is described above with respect to FIG. 2.

The application layer enables the users and maintainers of the system 300 to interact with it in a range of ways including visualization, update, and maintenance and ontologic mapping. In an exemplary embodiment, the application layer is implemented by the BoKWiki 220, the BoKVis 230, and the one or more user-developed applications 240 and their interfaces with the application server 310, e.g., the services 311 through 319, 342, and 344. In an exemplary embodiment, the system 300 may us a RESTful service so that users may access the BoKOnto 210 via the application server 310.

In a conventional BoK, concepts are nested in a hierarchy, often with defined depth levels, such as "Topics" being nested inside "Units" that are nested inside "Knowledge Areas." Each concept may be associated with a short list of references. The highest level in this organization is the knowledge area. Each knowledge area contains at least one unit and each unit contains one or more topics.

The hierarchical structure of the conventional BoK is disadvantageous. A hierarchical tree structure is a constrained form of knowledge organization because it only supports a parent-child relationship. In reality, there are many different types of relationships among concepts such as similarity, possession of multiple parents, or existence of a natural sequence (i.e., prerequisite concepts).

In accordance with an exemplary embodiment of the present invention, the BoKOnto 330 is a concept-based ontology having a network topology. The network topology is advantageous over the shortcomings of the simple hierarchical structure of the conventional BoK. In an exemplary embodiment, the topology of the BoKOnto 330 is represented using semantic web technologies in a framework, e.g., the Jena framework developed under the Apache Jena Project. One difference between the BoKOnto 330 and other ontology-based BoKs is in the conceptualization of the BoK (in the BoKOnto 330) as the basis of a reference system within which artifacts of a knowledge domain can be located through either assertion or inference. The metaphoric transfer of geographic approaches for creating and using locational reference systems is an important consideration in this regard, carrying with it notions of measurement (i.e. taking stock of the size, shape, structure, and evolution of the knowledge domain), standardization, and projection.

The structure of the BoKOnto 330 may be implemented using a semantic web technology, such as Jena software and ontology standards, such as Simple Knowledge Organization System (SKOS). SKOS is advantageous because it is a W3C standard that was specifically designed for classification schemes and subject-heading lists.

Figure 4:
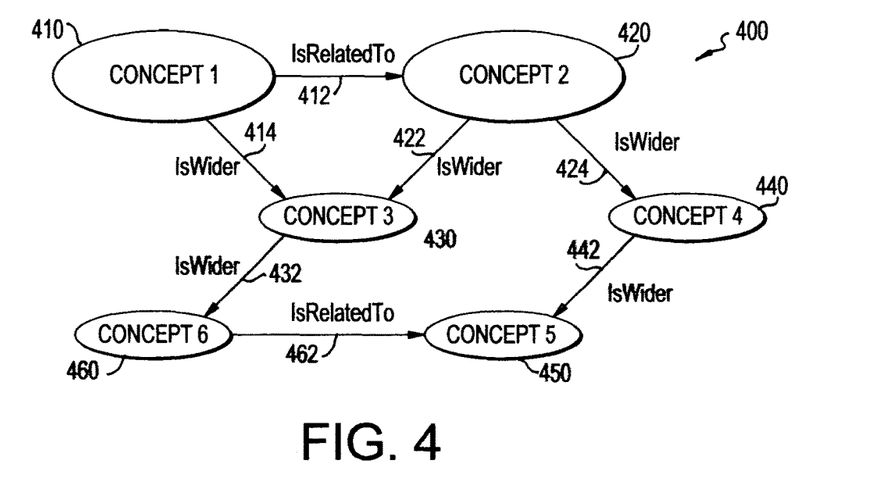
FIG. 4 illustrates an exemplary network topology, in accordance with an exemplary embodiment of the present invention.

An example of a network topology of an exemplary embodiment of the BoKOnto 330 is illustrated in FIG. 4, in accordance with an exemplary embodiment of the present invention. The network topology, generally designated as 400, comprises six concepts 410, 420, 430, 440, 450, and 450 and their relationships. The concept 410 is related to (isRelatedTo 412) the concept 420 and is wider (isWider 414) than the concept 430. The concept 420 is wider (isWider 422) than the concept 430 and is wider (isWider 424) than the concept 440. The concept 430 is wider (isWider 432) than the concept 460. The concept 440 is wider (isWider) 442 than the concept 450. The concept 460 is related to (isRelatedTo 462) the concept 450.

Figure 5:
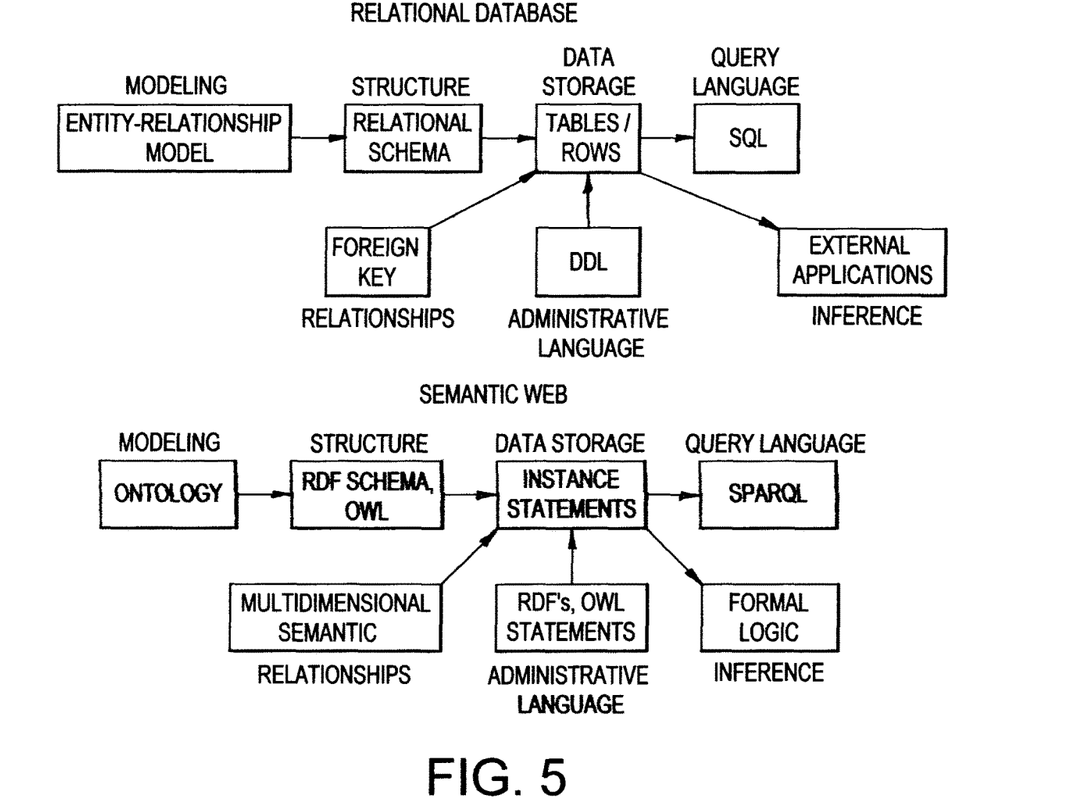
FIG. 5 shows a comparison between a relational database based and a semantic web based knowledge modeling, in accordance with an exemplary aspect of the present invention.

Relational databases are limited to one kind of relationship that is identified by a foreign key. A semantic web used by the BoKOnto 330 offers more complex relationships, such as inheritance, part-of, associated-with, and many others, including logical relationships and constraints and is, therefore, advantageous over relational databases. FIG. 5 shows a comparison between a relational database based and a semantic web based knowledge modeling, in accordance with an exemplary aspect of the present invention.

The exemplary embodiment of the BoKOnto 330 captures relationships among concepts through part-whole hierarchies and associations, employing semantic web standards for formal ontologies. For example, although any particular "Knowledge Area" may be a penultimate (or top-level) designation in the taxonomy today, it may be subsumed by another category in the future while still retaining its original sub-categories. As an example, the history of the evolution of academic disciplines suggests that the actual contents of some original disciplines (e.g. Newtonian physics) remain intact while their hierarchical relationships are in flux.

The domain ontology 210 contains instances of certain types or classes of subject and objects. Exemplary core classes of the domain ontology 210 are described below:

"Concept": This is the parent class of BoKConcept and BoKSkill. It captures similar properties exhibited by both, such as hierarchical (part/whole), similarity, sequence, and versioning relationships.

"BoKConcept": Whereas a conventional BoK may designate a fixed multi-level hierarchy, in which concepts are instances of particular depth classes, the ontology 210 seeks to be more flexible, to better represent the dynamic, interconnected structure of a knowledge corpus, by combining all of the levels into a single concept class. A BoKConcept is thus a distinct unit of knowledge of any breadth or depth. By example, "analysis," "proximity-based analysis", "buffer," and "polygon buffer" are all instances of the BoKConcept class that are linked together by a chain of super-/sub-concept relationships.

"BoKSkill": This class encapsulates the particular tasks or learning objectives through which knowledge regarding a particular BoKConcept may be applied or demonstrated; for example, "create buffers of a particular distance from a set of point, line, or area features." A course may teach this skill, a person may be capable of performing this skill, and a project may require this skill in order to be successfully completed.

"BoKElement": This class is a parent of BoKRef, BoKAgent, and BoKModule. This class captures these three subclasses, two of which are clearly relatable to concepts, namely references and agents. The third subclass is BoKModule which is less central to the support of a concept and can include any set of knowledge artifacts, such as courses, an individual's skill set, and curricula.

Figure 8:
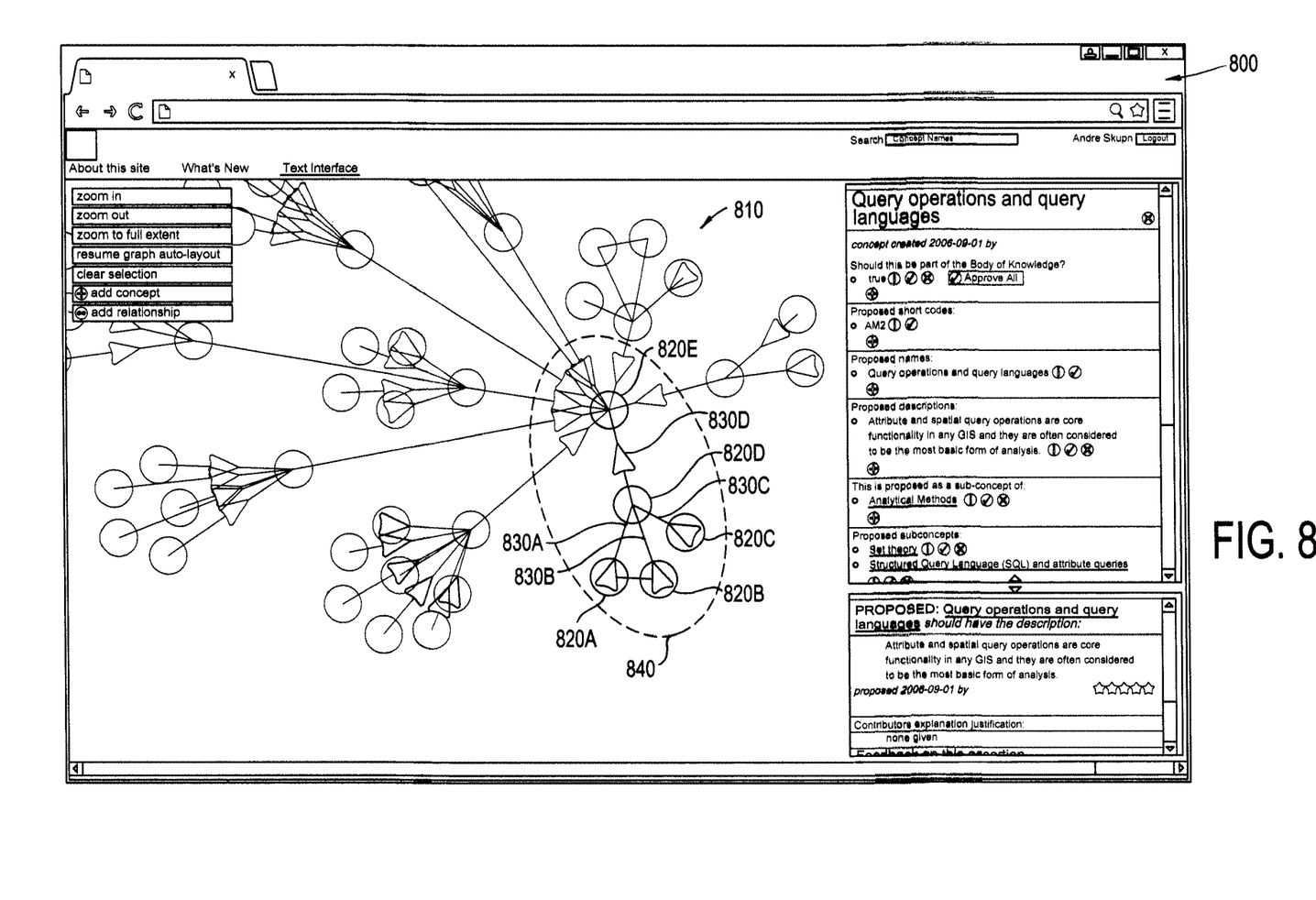
FIG. 8 illustrates a synaptic view of a domain ontology, in accordance with an exemplary embodiment of the present invention.

"BoKRef": This class is reserved for knowledge artifacts that are central to understanding a concept. In other words, it can be thought of as providing primary sources for the concept. FIG. 8 shows the relationship between a reference and a concept, in accordance with an exemplary embodiment of the present invention. It is important here to note that, should the reference have pointed to a concept narrower than a concept of interest, then the ontology would have been able to infer that it was a reference for a concept of interest by extension. This is accomplished by using a basic property chain to assign reference by extension through part-whole relationships.

"BoKAgent": The class is the agent associated with the BoKRef, such as its author or institution. The relationship between References and Agents commonly comprises a journal article and an associated set of authors.

"BoKModule": The most basic collection of elements is the module, which could be any set of knowledge artifacts that are defined by some theme, entity, or unifying process. For instance, a course which consists of parts including a basic introduction, a query module on SQL, and a technical introduction could represent a module, as illustrated in FIG. 5, in accordance with an exemplary embodiment of the present invention. It should be noted that any one of these modules could potentially have their own nested series of modules, each with an associated set of concepts. Much like the hierarchical inheritance (and use of a property chain) between references and concepts, the connection between modules and concepts leverages membership to extend a module's attachment to a concept.

Figure 6:
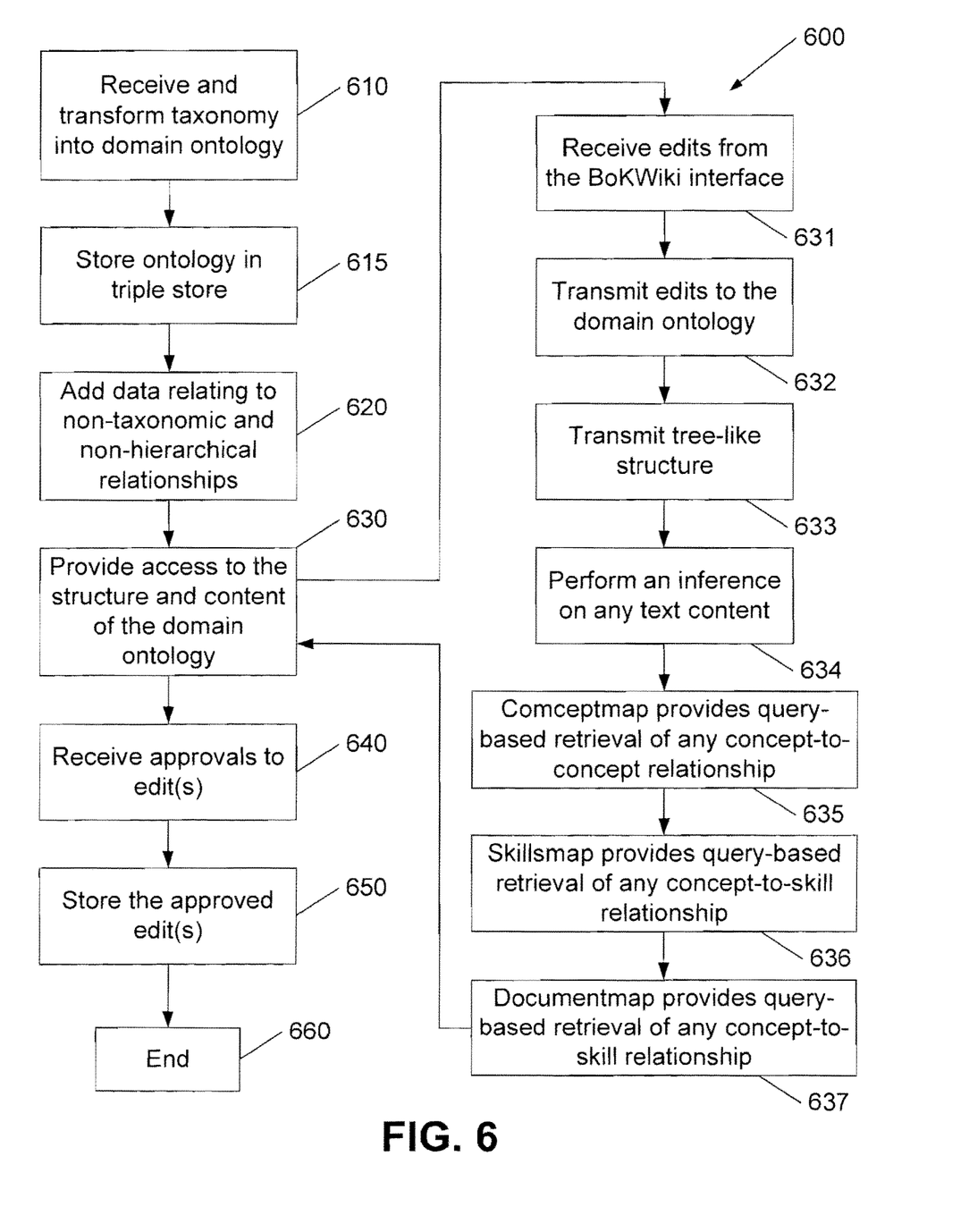
FIG. 6 illustrates a method of creating and updating a domain ontology, in accordance with an exemplary embodiment of the present invention.

Referring now to FIG. 6, there is illustrated a method, generally designated as 600, of creating and updating the BoKOnto 330 by the server 110 (specifically by the application server 310), in accordance with an exemplary embodiment of the present invention. The method 600 provides for building, editing, maintaining, managing, visualizing and using, a domain-specific knowledge repository. The method 600 begins with a Step 610 of receiving data specifying a taxonomy and transforming the taxonomy into a domain ontology, i.e., the BoKOnto 330. The domain ontology is stored in the triple store 115, Step 615.

The data specifying the taxonomy comprises domain concepts and, optionally, relationships between domain concepts and domain skills, or between domain concepts and source documents, or among domain concepts, domain skills, and source documents. The domain concepts and, where used, domain skills and source documents together form a domain-specific body of knowledge (BoK). In an exemplary embodiment, the BoK may be used to ascertain competency of a person in a field of study or endeavor.

At least two exemplary implementations of the Step 610 are contemplated. In a first exemplary implementation, in the Step 610, the server application 310 directly loads the domain taxonomy 339 and transforms the domain taxonomy 339 to form the BoKOnto 330. In a second exemplary implementation, in the Step 610, the server application 310 receives data specifying a taxonomy, e.g., taxonomic links, via the BoKWiki interface 322. The server application 310 transforms the received data to form the domain ontology 330.

The method 600 continues to a Step 620 of adding, to the BoKOnto 330 in the triple store 115, data relating to non-taxonomic and non-hierarchical relationships. A relationship may be between one domain class (e.g., a concept) and another domain class (e.g., a concept) stored in the triple store 115. The relationship of a domain concept (subject) to a domain concept (object) may be specified by any one of the following predicates: "broader" (superconcept), "narrower" (subconcept), "pre-requisite", "post-requisite", "similar", and "succeeding" (versioning relationship). The "succeeding" predicate specifies that the associated object is a deprecated, older version of the associated subject.

A relationship may be between a domain concept and a domain skill stored in the BoKOnto 330 in the triple store 115. The relationship of a domain concept (subject) to a domain skill (object) specifies how an understanding of the domain concept can be demonstrated. A relationship may also be between a domain concept and a document that serves as evidentiary and explanatory sources for the concept's existence and nature.

The application server 310 loads two types of conditions schema into the triple store 115: the BoK semantic conditions schema 331 and the general semantic conditions schema 333. The triple store 115 is configured for handling these schema 331 and 333. With respect to the general semantics conditions schema 331, the semantic conditions supported by such a schema 331 are the "broader" and "narrower" relationships and several types of relationships expressing properties of concepts. The BoK semantic conditions schema 333 provide certain additional semantic conditions that are non-taxonomic and non-hierarchical, such as concept versioning, "similar," "pre-requisite," and "post-requisite." The latter two are meant to express a certain sequence within which concepts are treated in a given process, such as for a learning sequence.

In a Step 630, the method 200 gives, to the one or more user-developed applications 240, programmatic access to the structure and content of the BoKOnto 330 via the services 311 through 319. In the Step 430, the method 200 also gives, to the BoKWiki 220, access to the structure and content of the BoKOnto 330 via the services 342 and 344. The application server 310 interfaces with the BoKOnto 330 through the interface 320 to provide access of the BoKWiki 220 and the one or more user-developed applications 240 to the BoKOnto 330. The application server 310 interfaces with the triple store 115 and the BoKOnto 330 via the interface 320 to load data from the BoKOnto 330 and to write data, such as edits, to the BoKOnto 330. In the exemplary embodiment illustrated in FIG. 3, the services 313 through 319 are web services, but it is to be understood that these services 313 through 319 are not limited to being web services but may be any kind of services that provide for access of the domain ontology 330 to other programs. The Step 630 comprises sub-steps 431-437 described below.

In a sub-step 631, the Wiki write service 344 receives requests for edits from the BoKWiki interface 322, feedback from authenticated users on edits, and approvals from editors on edits proposed by authenticated users. The Wiki write service 344 holds edits proposed by authenticated users in abeyance until receiving an approval message from a BoKWiki interface 322 operated by an editor.

An edit may include a change to any triple in the BoKOnto 330. Thus, a request for an edit received by the Wiki write service 344 may specify the addition of a triple to the triple store 115, a deletion of a triple to the triple store 115, or a modification to a triple of the triple store 115. Each of such possible edits changes the BoKOnto 330.

An addition of a triple to the triple store 115 may comprise any combination of a new subject, new object, or new predicate, an existing subject, an existing object, or an existing predicate in the triple store 115. Generally speaking, an addition will not comprise a triple comprising an existing subject, an existing object, and an existing predicate as such triple would duplicate one already in the triple store 115. However, an addition may comprise a triple comprising an existing subject, an existing object, and a new predicate or a new subject, an existing object, and an existing predicate, etc. A modification to a triple of the triple store 115 may involve changing any of a subject, object, and predicate in an existing triple in the triple store 115.

In a sub-step 632, the Wiki load service 342 transmits edits to the BoKOnto 330 in the triple store 115 to the BoKWiki interface 322 for forwarding, if applicable, to the BoKWiki database 324 to keep the BoKWiki database 324 in sync with the BoKOnto 330 stored in the triple store 115.

In a sub-step 633, the Concept hierarchy service 319 retrieves data representative of the hierarchy of concepts in the BoKOnto 330 stored in the triple store 115, formats it into a tree-like structure, and transmits the tree-like structure to the BoKVis 230.

In a sub-step 634, the Topic inference service 317 performs an inference on any text content (arbitrary, user-supplied, or extracted from the BoKOnto 330, or from any other data source containing text data). Such inference determines loadings for either term/phrase vectors, or latent topic vectors, or concept vectors. The Topic inference service 317 transmits the result in one of several formats, including XML, JSON, and plain text to the one or more user-developed applications 240.

In a sub-step 635, in response to a request received from one of the one or more user-developed applications 240, which request comprises text identifying one or more concepts, the Conceptmap service 315 provides a query-based retrieval of any concept-to-concept relationship in the BoKOnto 320 and transmits the result(s) in one of several formats, including XML, JSON, and plain text to the one or more user-developed applications 240.

In a sub-step 636, in response to a request received from one of the one or more user-developed applications 240, which request comprises text identifying one or more skills, the Skillsmap service 313 provides a query-based retrieval of any concept-to-skill relationship in the BoKOnto 330 and transmits the result(s) in one of several formats, including XML, JSON, and plain text to the one or more user-developed applications 240.

In a sub-step 637, in response to a request received from one of the one or more user-developed applications 240, which request comprises a document, the Documentmap service 311 provides a query-based retrieval of any concept-to-document relationship in the BoKOnto 330 and transmits the result(s) in one of several formats, including XML, JSON, and plain text to the one or more user-developed applications 240.

The method 600 continues to a Step 640, in which the application server 310 receives approvals to edit(s) from a BoKWiki interface 322 used by an editor. After the Wiki write service 344 receives notification from a BoKWiki interface 322 used by an editor that an edit received from a BoKWiki interface 322 used by an authenticated user is approved, the method 600 continues to a Step 650. Otherwise, the method 400 remains at the Step 640 waiting to receive approval for an edit.

In the Step 650, Wiki write service 342 stores the approved edit(s) in the BoKOnto 330 of the triple store 115. The edits are stored in the BoKOnto 330 such that versioning is accomplished through application of temporal tags to the edits. Thus, deprecated versions of a concept remain available. Edits to the BoKOnto 330 by other means, such as direct edits by an administrator or by inference, are also stored in the BoKOnto 330 such that versioning is accomplished through application of temporal tags.

The method 600 ends in a Step 660.

Figure 7:
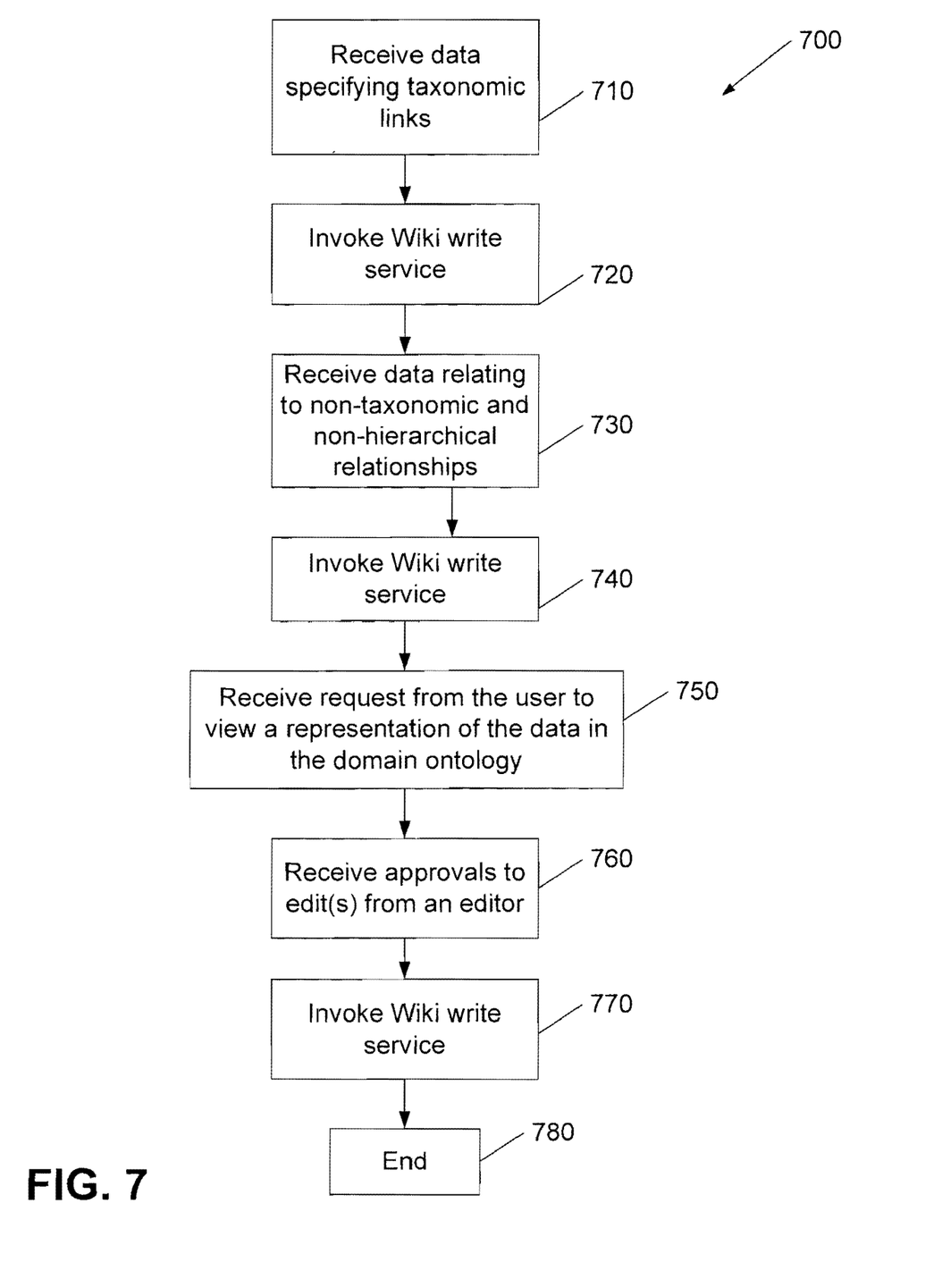
FIG. 7 illustrates a method of creating, updating, and viewing representations of data of a domain ontology, in accordance with an exemplary embodiment of the present invention.

Referring now to FIG. 7, there is illustrated a method, generally designated as 700, of creating, updating, and viewing representations of data of the domain ontology 330 by the client computer 130 (specifically the BoKWiki 220). In a Step 710, the BoKWiki interface 322 receives the data specifying taxonomic links from a user of the BoKWiki 220. In a Step 720, the BoKWiki interface 322 invokes the Wiki write service 344 of the application server 310 to transmit the received data to the application server 310 to be written to the domain ontology 330. (The application server 310 receives such data in the Step 410.)

In a Step 730, the BoKWiki interface 322 receives data relating to non-taxonomic and non-hierarchical relationships from the user of the BoKWiki 220. In a Step 740, the BoKWiki interface 322 invokes the Wiki write service 344 of the application server 310 to transmit the data received in the Step 530 to the application server 310 to be written to the BoKOnto 330. (The application server 310 receives such data in the Step 620.)

Figure 9:
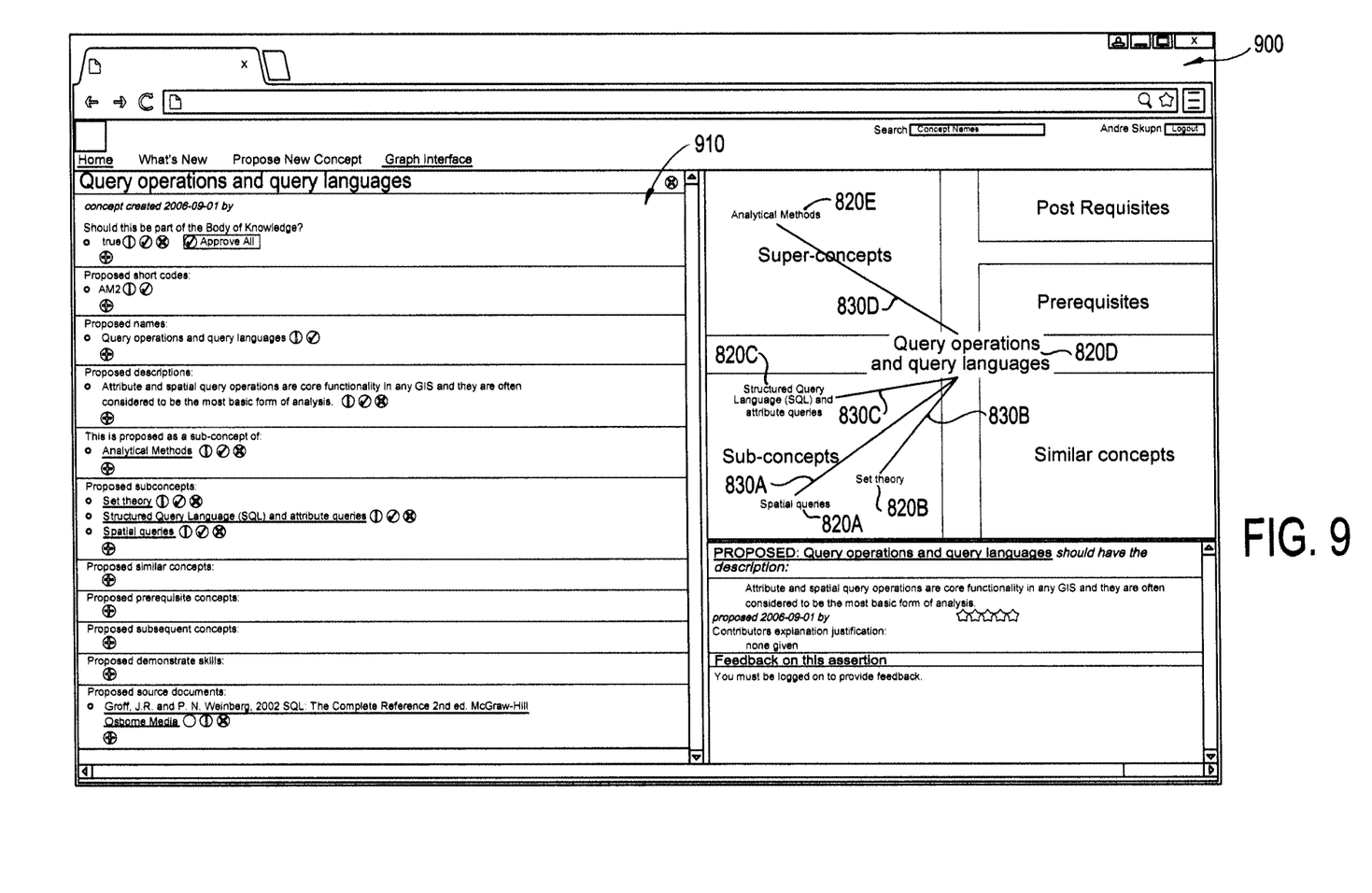
FIG. 9 illustrates a focal view of a domain ontology, in accordance with an exemplary embodiment of the present invention.

In a Step 750, the BoKWiki interface 322 receives a request from the user to view a representation of the data in the BoKOnto 330. The BoKWiki interface 332 transmits the request to the application server 310 (specifically to the Wiki load service 342]). The Wiki load service 342 retrieves the requested data from the BoKOnto 330, formats it in accordance with the request, and transmits it to the BoKWiki interface 322. The user can choose among different text and graphical displays and interfaces, including a synaptic view and a focal view of the data in the domain ontology 330. FIGS. 8 and 9 illustrate exemplary views of a synaptic view and a focal view, respectively, in accordance with an exemplary embodiment of the present invention.

In a Step 760, the BoKWiki interface 322 receives approvals to edit(s) from a an editor. In a Step 770, the BoKWiki interface 322 invokes the Wiki write service 344 of the application server 310 to transmit the approval received in the Step 770 to the application server 310. (The application server 310 receives such data in the Step 640.)

The method 700 ends in a Step 780.

The method 700 is performed by the BoKWiki interfaces 322 of client computers 130 accessed by authorized users and editors. It is to be understand that any of the client computers 130A, 130B, . . . , 130N may perform the method 700 and that they may perform it at any time. The application server 310 is configured for accepting invocations of the Wiki write service 344 by different users at the same time. Thus, the software framework 300 allows authorized users to perform edits to the structure and content of the domain ontology 330 in a collaborative manner using a wiki-type web interface and application referred to herein as BoKWiki 220. As described, edits occur through proposals made by authenticated users, which are reviewed and approved or rejected by authenticated editors. Users are able to propose the addition, deletion, or modification of domain concepts and their relationships, as well as skills and source documents in the domain ontology 330.

Referring now to FIG. 8, there is illustrated a synaptic view, generally designated as 800, of the BoKOnto 330, in accordance with an exemplary embodiment of the present invention. The synaptic view 800 includes a zoomable graph display 810 of all concepts 820A, 820B, 820C, 820D, 820E, . . . , etc. and relationships 830A, 830B, 830C, 830D, . . . , etc. in the BoKOnto 330. In this site, users can navigate a network graph of related BoK concepts, view detailed information about each concept and relationships between concepts, propose their own additions and modifications to the content of the BoK.

Referring now to FIG. 9, there is illustrated a focal view, generally designated as 900, of the BoKOnto 300, in accordance with an exemplary embodiment of the present invention. The focal view 900 contains the same editing functionality as the synaptic view 800, but includes a graph 910 that is exclusively centered on a user-chosen focus concept 840 (illustrated in FIG. 8) and displays all its concepts 820A, 820B, 820C, 820D, and 820E and relationships 830A, 830B, 830C, and 830D. Both views 800 and 900 interface with the BoKOnto 330 and edits made in one are immediately accessible in the other view. Views in the BoKWiki framework 300 are driven either by data stored in the dedicated BoKWiki database 324 or accessed from the triple store 115 via the Wiki load service 322.

Using the BoKOnto 330 as the foundation of the knowledge reference system 300 enables mapping, by the application server 310 in response to a request from one of the one or more user-developed applications 240, any domain knowledge entity (i.e., any artifact, actor, or activity associated with the domain) with respect to elements of the domain ontology or any other domain knowledge entity using the Conceptmap service 315, the Skillsmap service 313, and the Documentmap service 311 in the respective sub-steps 635, 636, and 637 of the method 600. These mappings are based on employing vector space representations for knowledge entities, concepts, and skills. When the knowledge reference system 300 is implemented, the specific meaning and utility of the loadings of the dimensions of a vector depend on the application context and on the particular knowledge entities, concepts or skills involved, including:

loading as "similarity"—how similar the digital representation of a knowledge entity is to the digital representation of a domain concept;

loading as "relevance"—how relevant a knowledge entity is to understanding a domain concept, or to supporting its existence/inclusion in the domain ontology, or to supporting its relative position therein; and loading as "skill level"—the degree to which a person or a group of persons understand the meaning and purpose of a domain concept, have the ability to answer questions, and/or perform tasks with respect to a domain concept or skill.

Creation of the knowledge reference system 300 involves:

choosing a general approach for defining dimensions, i.e., to decide whether individual dimensions will correspond to terms/phrases, latent topics, or a set of concepts;

executing computational techniques that determine the specific meaning of each of these dimensions, i.e. which specific set of terms/phrases or latent topics or concepts would define the dimensions;

providing computational means that allow transforming a knowledge entity, concept, skill, or user-supplied text content into a vector of those defined dimensions.

Mapping any item (i.e., knowledge entity, concept, skill, or user-supplied text content) into the knowledge reference system 300 involves generating loadings for each dimension within the vector representing the item. These loadings can be either asserted or computationally inferred, as follows:

asserting, by a user via a client interface component 220 of a client computer system 130, a specific loading for a particular dimension by letting users choose from a range of possible values. For example, users can assert their own skill levels or judge the skill level of other persons. Another example comprises of a user assigning a value for how relevant a domain concept is for comprehending a particular knowledge entity, like a lecture or research paper.

inferring, by the server application 310, specifically the Topic Inference server 317, in the sub-step 634 of the method 600, loadings for the vector representing an item individually—by analyzing its digital content—or perform inference by propagating such individually inferred or asserted loadings through the relationship network of domain concepts. As an example for the latter, if a user asserts a particular skill level for a domain concept, then the server application 310 can propagate these scores to other domain concepts in the sub-step 634 of the method 600 by tracing concept relationships. During such propagation, scores can be accumulated in several ways, including summarization and averaging over all domain concepts encountered along the network.

Other functionality of the knowledge reference system 300—specifically the server application 310—includes:

using natural language processing to extract from text representations of domain concepts either a set of individual terms/phrases or a set of latent topics. By means of these terms/phrases or latent topics, the text content of any knowledge entity, domain concept, or domain skill is then transformed into high-dimensional vectors whose dimensionality is equal to the number of unique terms/phrases or the number of latent topics.

performing computations involving the loadings of either the term/phrase vectors or the topic vectors or the concept vectors for multiple knowledge entities and/or domain concepts, such that their differences, similarities, and other measures can be ascertained. We refer to these operations collectively as knowledge algebra.

developing, by the Concept hierarchy service 319 in the sub-step 632 of the method 600, a visualization or data to be used in a visualization and transmitting such visualization or such data to the one or more user-developed applications 240 for visualizing the structure and content of the knowledge domain by laying out domain concepts and their relationships in a low-dimensional display space, while giving a user a choice via the one or more user-developed applications 240 among several layout techniques and the ability to fluidly switch between different layouts. These include base map layouts representing concepts as nodes and relationships as lines driven by network connections and other layouts based on the similarity among domain concepts, as derived from either the term/phrase vectors or topic vectors or concept vectors.

enabling such domain visualizations to act as base maps that support the execution of visual overlays. In a visual overlay, the geometric aspects of the representation of concepts and skills (i.e., their position and shape) is combined with a manipulation of their visual appearance, in which certain computationally derived weights are driving changes in certain visual variables, such as color hue, color value, color saturation, of transparency. The weights are derived from any asserted or inferred vector for any knowledge entity, domain concept or skill; any arbitrary, user-supplied text content; or results of knowledge algebra operations involving term/phrase vectors or topic vectors or concept vectors of any group of knowledge entities, domain concepts, skills, or user-supplied text content.

As discussed above, the BoKOnto 330 is maintained dynamically in a bottom-up fashion. To that end, a collaborative knowledge reference system 300 is provided. It may use experts from many sub-disciplines, including academe and professional practice, and from many countries. It also provides for computation and visualization.

Structuring core domain concepts via semantic web standards for formal ontologies and envisioning the BoKOnto 330 as a core component of a reference system 300 via which to project and analyze knowledge artifacts has implications for the transformation of existing BoK structures towards the BoKOnto 330. Primary among these is the ability to re-evaluate the content structure of a conventional BoK, the ability to restructure its hierarchical model into a semantic network model, and the affordance of continuous update and maintenance of the BoKOnto 330.

The knowledge reference system 300 provides a comprehensive solution to storing, maintaining, updating, and using comprehensively structured collections of domain-specific concepts, terms, and activities. Examples of such collections are the bodies of knowledge (BoK) developed in numerous domains, including project management, civil engineering, computer science, or business analysis, and the ontologies developed in such domains as medicine. Our technological solution operationalizes these kinds of formal collections of domain knowledge such that novel approaches to domain knowledge management and exploitation are possible. Contrary to the traditional focus on curricular development, the anticipated applications can now span the full range of domain activities, from research to education, professional practice, and human resource management. Much about the approach described herein is driven by interpreting domain actors (e.g., students, educators, job applicants, companies), artifacts (e.g., textbooks, research articles, job ads), and activities (e.g., write code, perform analysis, fill vacant position) as existing in a single space whose structure and shape is described by a body of knowledge. By building on traditional concepts from geographic information science—like coordinate systems and projections—the approach introduces a comprehension vision for domain-specific knowledge reference systems.

Envisioned applications enabled by the computational infrastructure components described herein range from focused end-user tools to the broad analytical needs of managers and researchers. For example, a job applicant could simply paste the text of her/his resume and the text of a job advertisement into a search window and would be shown a detailed "map" of topical overlaps and gaps existing and required skill. Analysis of a course catalog could then be used to identify possible classes that could remedy gaps in knowledge. In a similar manner, an HR manager could compare the skills of multiple job applicants via a highly visual representation. On the analytical side of the application spectrum, the technology could drive a dashboard keeping track of the trends in the level of educational attainment of groups of students. This could be done with much more control over topical granularity than has so far been possible. For example, one could keep track of how students have been performing in answering specific questions (e.g., "Use the method of completing the square to transform any quadratic equation in x into an equation of the form $(x-p)2=q$ that has the same solutions. Derive the quadratic formula from this form.") or observe students' aggregate performance at a coarse topical scale (e.g., "High School Algebra").

The approach to domain knowledge management and exploitation described herein is also about breaking down the many barriers that have traditionally existed between the concerns of research, education, and professional practice. Consider the example of high-end analytical software systems, which often consist of hundreds of functions. With an operationalized body of knowledge as providing a unifying reference system, one could now easily answer questions like: "Show me a list of case studies in which the method used in this tool has previously been applied!"

Compared to the traditionally expert-driven, top-down approach to developing domain bodies of knowledge, the approach described herein to editing and updating a domain body of knowledge—through a wikified environment—allows for a much more inclusive process, in which all members of the domain community can participate. A unique weighting mechanism allows for differentiated handling of contributions.

The computer-readable medium 112 comprises software code stored thereon that, when executed by the processor 114 of the server 110 causes the server 110 to perform any of the functionality of the server 110 described herein. Thus, any of the functionality performed by the server 110 described herein, such as the method 600, is implemented in software code or instructions which are tangibly stored on the computer readable medium 112. Upon loading and executing such software code or instructions by the processor 114, the server 110 may perform any of the functionality of the server 110 described herein, including any steps of the method 600 and any of the features and functionality of the server 110 described herein.

Each of the computer-readable media 132A, 132B, . . . , 132N comprises software code stored thereon that, when executed by the respective processor 134A, 134B, . . . , 134N causes the respective client computer system 130A, 130B, . . . , 130N to perform any of the functionality of the client computer systems 130 described herein. Thus, any of the functionality performed by the computer systems 130 described herein, such as the method 700, is implemented in software code or instructions which are tangibly stored on the computer readable media 132A, 132B, . . . , 132N. Upon loading and executing such software code or instructions by the processor 134A, 134B, . . . , 134N of a respective client computer system 130A, 130B, . . . , 130N, the respective client computer system 130A, 130B, . . . , 130N may perform any of the functionality of the client computer systems 130 described herein, including any steps of the method 700 and any of the features and functionality of the client computer systems 130 described herein.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A computer system for maintaining a domain ontology, the computer system comprising:
   a computer-readable tangible medium comprising software instructions; and
   a processor configured to access the computer-readable tangible medium to load and execute the software instructions to provide:
   a body of knowledge ontology component comprising a triple store comprising at least one version of a domain ontology, the domain ontology including concepts and relationships between the concepts in a network topology structure, the at least one version comprising a current domain ontology, the current domain ontology comprising a multi-dimensional vector space with vectors representing the concepts;
   an application server that maps the concepts of the current domain ontology to infer relationships between the concepts based on the vectors representing the concepts in the multi-dimensional vector space;

a body of knowledge wiki, separate from the body of knowledge ontology component, comprising a body of knowledge wiki database;

a wiki load service that populates the body of knowledge wiki database by loading at least a portion of the current domain ontology from the triple store;

a client interface for an authenticated user that provides functionality for the authenticated user to view the concepts and relationships of the current domain ontology in the network topology structure of the current domain ontology and to propose an edit to the portion of the current domain ontology populating the body of knowledge wiki database;

a client interface for an editor that provides functionality for the editor to view and approve the proposed edit to the body of knowledge wiki database; and a wiki write service for deprecating or replacing the current domain ontology, based on the proposed edit to the body of knowledge wiki database, in response to the approval of the proposed edit to the body of knowledge wiki database.

2. The computer system of claim 1, wherein the processor is further configured to access the computer-readable tangible medium to load and execute the software instructions to further provide a load service to transmit data of the domain ontology to the client interface for the authenticated user.

3. The computer system of claim 1, wherein the processor is further configured to access the computer-readable tangible medium to load and execute the software instructions to further provide a load service to transmit data of the domain ontology to a client interface of an unauthenticated user.

4. The computer system of claim 1, wherein the processor is further configured to access the computer-readable tangible medium to load and execute the software instructions to further provide a service for:
retrieving data of the domain ontology of the triple store;
reformatting the retrieved data to a tree structure; and
transmitting the tree structure to the client interface for the authenticated user.

5. The computer system of claim 1, wherein the domain ontology comprises a plurality of triplets, each triplet comprising a subject, a predicate, and an object, the predicate specifying the relationship between the subject and the object.

6. The computer system of claim 5, wherein the proposed edit to the portion of the current domain ontology populating the body of knowledge wiki database comprises a request to add a new triplet to the triple store, the new triplet comprising a new object and a new predicate specifying a relationship between the new object and an object or subject of one of the plurality of triplets of the domain ontology.

7. The computer system of claim 5, wherein the proposed edit to the portion of the current domain ontology populating the body of knowledge wiki database comprises a request to add a new triplet to the triple store, the new triplet comprising a new subject and a new predicate specifying a relationship between the new subject and an object or subject of one of the plurality of triplets of the domain ontology.

8. The computer system of claim 5, wherein the proposed edit to the portion of the current domain ontology populating the body of knowledge wiki database comprises a request to add a new triplet to the triple store, the new triplet comprising a new predicate specifying a relationship between an object of one of the plurality of triplets of the domain ontology and a subject of another one of the plurality of triplets of the domain ontology.

9. The computer system of claim 1, wherein:
the processor is further configured to access the computer-readable tangible medium to load and execute the software instructions to further provide a service for:
determining at least some of the vectors that represent at least some of the plurality of concepts by:
using natural language processing to analyze text representations of the concepts and extract terms, phrases, or latent topics; and
transforming the terms, phrases, or latent topics into vectors in the multi-dimensional vector space;
receiving a request identifying at least one concept from a user-developed application; and
transmitting a response identifying a relationship between the at least one concept identified in the request and the one or more additional concepts of the current domain ontology inferred based on the vectors representing the at least one concept identified in the request and the one or more additional concepts of the current domain ontology.

10. The computer system of claim 9, wherein at least some of the vectors that represent at least some of the plurality of concepts are determined by propagating vectors from additional concepts that have an inferred relationship to the at least some concepts.

11. The computer system of claim 9, wherein:
at least some of the concepts of the current domain ontology are skills.

12. The computer system of claim 11, wherein at least some of the vectors that represent at least some of the plurality of skills are determined by propagating vectors from the one or more concepts that have an inferred relationship to the one or more skills.

13. The computer system of claim 9, wherein:
at least some of the concepts of the current domain ontology are documents.

14. The computer system of claim 13, wherein at least some of the vectors that represent at least some of the plurality of documents are determined by propagating vectors from the one or more concepts that have an inferred relationship to the one or more documents.

15. A method for maintaining a domain ontology, the method comprising:
providing access to a body of knowledge ontology component comprising at least one version of a domain ontology stored on a triple store, the domain ontology including concepts and relationships between the concepts in a network topology structure, the at least one version comprising a current domain ontology, the current domain ontology comprising a plurality of concepts represented by vectors in a multi-dimensional vector space;
mapping the concepts of the current domain ontology to infer relationships between the concepts based on the vectors representing the concepts in the multi-dimensional vector space;
providing access to a body of knowledge wiki, separate from the body of knowledge ontology component, comprising a body of knowledge wiki database;
populating the body of knowledge wiki database by loading at least a portion of the current domain ontology from the triple store;
receiving a request from a client interface of a first client computer of an authenticated user to view the concepts and relationships of the current domain ontology in the network topology structure of the current domain ontology and proposing an edit to the portion of the current domain ontology populating the body of knowledge wiki database;

receiving approval of the proposed edit to the body of knowledge wiki database from a client interface of a second client computer of an editor, the client interface of the second computer of the editor providing functionality for the editor to view and approve the proposed edit to the body of knowledge wiki database; and deprecating or replacing the current domain ontology, based on the proposed edit to the body of knowledge wiki database, in response to the approval of the proposed edit to the body of knowledge wiki database.

16. The method of claim 15, further comprising steps of:
loading the current domain ontology;
converting the domain ontology to a tree structure; and
transmitting the tree structure to a client interface of a second client computer system.

17. The method of claim 15, further comprising:
transmitting data of the domain ontology to the client interface of the first client computer.

18. The method of claim 15, further comprising:
transmitting data of the domain ontology to a client interface of an unauthenticated user.

19. The method of claim 15, wherein the domain ontology comprises a plurality of triplets, each triplet comprising a subject, a predicate, and an object, the predicate specifying the relationship between the subject and the object.

20. The method of claim 19, wherein the proposed edit to the portion of the current domain ontology populating the body of knowledge wiki database comprises a request to add a new triplet to the triple store, the new triplet comprising a new object and a new predicate specifying a relationship between the new object and an object or subject of one of the plurality of triplets of the domain ontology.

21. The method of claim 19, wherein the proposed edit to the portion of the current domain ontology populating the body of knowledge wiki database comprises a request to add a new triplet to the triple store, the new triplet comprising a new subject and a new predicate specifying a relationship between the new subject and an object or subject of one of the plurality of triplets of the domain ontology.

22. The method of claim 19, wherein the proposed edit to the portion of the current domain ontology populating the body of knowledge wiki database comprises a request to add a new triplet to the triple store, the new triplet comprising a new predicate specifying a relationship between an object of one of the plurality of triplets of the domain ontology and a subject of another one of the plurality of triplets of the domain ontology.

23. The method of claim 15, further comprising:
determining at least some of the vectors that represent at least some of the plurality of concepts by:
using natural language processing to analyze text representations of the concepts and extract terms, phrases, or latent topics; and
transforming the terms, phrases, or latent topics into vectors in the multi-dimensional vector space;
receiving a request identifying at least one concept from a user-developed application; and
transmitting a response identifying a relationship between the at least one concept identified in the request and the one or more additional concepts of the current domain ontology inferred based on the vectors representing the at least one concept identified in the request and the one or more additional concepts of the current domain ontology.

24. The method of claim 23, wherein at least some of the vectors that represent at least some of the plurality of concepts are determined by propagating vectors from additional concepts that have an inferred relationship to the at least some concepts.

25. The method of claim 23, wherein at least some of the concepts of the current domain ontology are skills.

26. The method of claim 25, wherein at least some of the vectors that represent at least some of the plurality of skills are determined by propagating vectors from the one or more concepts that have an inferred relationship to the one or more skills.

27. The method of claim 23, wherein at least some of the concepts of the current domain ontology are documents.

28. The method of claim 27, wherein at least some of the vectors that represent at least some of the plurality of documents are determined by propagating vectors from the one or more concepts that have an inferred relationship to the one or more documents.

* * * * *